US005660451A

United States Patent [19]

Glynn

[11] Patent Number: 5,660,451

[45] Date of Patent: Aug. 26, 1997

[54] COMPUTER COMPONENT SECURITY DEVICE WITH PARALLEL TABLE SECURING MEANS

[75] Inventor: Kenneth P. Glynn, Flemington, N.J.

[73] Assignee: Ideal Ideas, Inc., Flemington, N.J.

[21] Appl. No.: 592,057

[22] Filed: Jan. 26, 1996

Related U.S. Application Data

[63] Continuation-in-part of Ser. No. 380,033, Jan. 30, 1995.

[51] Int. Cl.[6] .......... A47B 81/00; F16M 13/00

[52] U.S. Cl. .......... 312/223.2; 312/222; 312/140.4; 70/58; 248/551; 248/917

[58] Field of Search .......... 312/223.1, 223.2, 312/215, 222, 140.4; 70/58, 57; 108/90, 97, 98; 248/551, 917, 918, 919

[56] References Cited

U.S. PATENT DOCUMENTS

| | | | |
|---|---|---|---|
| 1,007,727 | 11/1911 | Onken | 108/90 |
| 4,585,202 | 4/1986 | Parsekian | 70/58 X |
| 4,600,250 | 7/1986 | Windham | 248/917 X |
| 4,624,510 | 11/1986 | Jedziniak | 248/917 X |
| 4,858,878 | 8/1989 | Gassaway | 248/551 |
| 5,135,197 | 8/1992 | Kelley et al. | 248/551 |
| 5,169,114 | 12/1992 | O'Neill | 248/551 |
| 5,228,658 | 7/1993 | Kelley | 248/551 |
| 5,311,397 | 5/1994 | Harshberger et al. | 70/57 X |
| 5,450,271 | 9/1995 | Fukushima et al. | 70/58 X |

FOREIGN PATENT DOCUMENTS

| | | | |
|---|---|---|---|
| 2160253 | 12/1985 | United Kingdom | 70/58 |

OTHER PUBLICATIONS

IBM Thinkpad, Dock I User's Guide (1993), 1st Edition, pp. 3–4.

*Primary Examiner*—Peter M. Cuomo
*Assistant Examiner*—James O. Hansen
*Attorney, Agent, or Firm*—Kenneth P. Glynn, Esq.

[57] ABSTRACT

The present invention is a computer component securing device, which has a main housing having a storage portion and a pair of table securing portions, a positioning means, a locking means, and a table securing means. The positioning means positions a computer component so as to have a first, open position wherein the computer component may be inserted and removed from the storage portion and so as to have a second, closed position such that an inserted computer component cannot be removed therefrom, but so as to expose the functional aspects of the computer component for utilization by a user when the positioning means is in its second, closed position. The positioning means is attached to said main housing. The locking means is connected to the positioning means and the main housing and is adapted so as to permit locking and unlocking of one of the positioning means and the main housing when the positioning means is in its second, closed position. The table securing means extends through at least one opening in the securing portion.

10 Claims, 11 Drawing Sheets

COMPUTER COMPONENT SECURITY DEVICE WITH PARALLEL TABLE SECURING MEANS

REFERENCE TO RELATED APPLICATION

This application is a continuation-in-part of currently pending U.S. patent application Ser. No. 08/380,033, filed on Jan. 30, 1995 and entitled "Computer Component Security Device" by the inventor herein.

BACKGROUND OF THE INVENTION

1. Field of the Invention

The present invention relates to computer component security devices, and, more particularly, to such devices which may be used for attachment to a table for subsequent long or short term attachment, with subsequent removal.

2. Information Disclosure Statement

Generally, computer security systems are either bolted to tables or require chains or wires looped around legs and thus being vulnerable to casual theft, e.g., merely by lifting the table and dropping the computer and chain down to remove it. Typical is International Business Machine's Security Hook for their Dock I® computer docking station. See IBM's *IBM ThinkPad, Dock I Users Guide* (1993), First Edition, page 3–4.

Another computer component securing device is a patent pending in which a C-clamp is modified to contain a lock attached to cable which threads through the C-clamp causing the C-clamp to remain clamped in place when the lock is locked. The cable is relatively easily capable of being cut, thus making the computer component readily available to theft. Moreover, the invention does not offer the expansive coverage of the present invention which allows a computer monitor and CPU to be secured with one set of bolts or clamps.

Notwithstanding the prior art, there seems to be no security systems for safely securing a computer component to a table, except for ineffective systems, and none renders the present invention obvious or unpatentable thereover.

SUMMARY OF THE INVENTION

The present invention is a computer component securing device, which has a main housing having a storage portion and a pair of table securing portions, a positioning means, a locking means, and a table securing means. The storage portion is adapted to store a computer component and is attached to each table securing portion.

Each table securing portion has a bottom, one sidewall, and a back, and at least one cut-out in at least one of the bottom, back and sidewall or an open front for passing a table securing device at least partially therethrough. The positioning means positions a computer component so as to have a first, open position wherein the computer component may be inserted and removed from the storage portion and so as to have a second, closed position such that an inserted computer component cannot be removed therefrom, but so as to expose the functional aspects of the computer component for utilization by a user when the positioning means is in its second, closed position. The positioning means is attached to the main housing.

The locking means is connected to the positioning means and the main housing and is adapted so as to permit locking and unlocking of one of the positioning means and the main housing when the positioning means is in its second, closed position.

The table securing means extends through the at least one opening in the securing portion and is connected to the securing portion inside the securing portion, and has an attachment mechanism outside of the securing portion which is securably connectable to a table, wherein the table securing means may be attached to a table from operating it from the inside of the securing portion and, when the positioning means is in its second, closed position and is locked, the table securing means cannot be unattached from the table without damaging the device or a table to which it is attached.

Another embodiment has the table securing portion within the same section of the main housing as the storage portion.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The purpose of the present invention is to provide a computer component security device to enable computer users at high risk or other locations to secure computers, computer components, or similar devices, e.g. an IBM® ThinkPad® or Dock I® docking station, an IBM® PS/1 CPU and monitor, a mini-tower, or a full tower, (IBM®, ThinkPad® and Dock I® are trademarks of International Business Machines Corporation, Research Triangle Park, N.C.). The devices may be used for general security, for absentee downloading and the like, while having the computer component and the present invention itself secured and locked to a table, to discourage and inhibit theft.

The present invention devices are generally reasonably sized, lightweight and are securable to a table, but easily removable at the end of use at that location. When a C-clamp or the like is used as part of the security device, the device is inert to its environment, i.e. it does not damage the table or desk to which it is attached. All of the devices do not damage the computer component (it needs no drilling, bolting or other alterations). Further, the devices are mechanically adaptable to different size tables and are reasonably invulnerable to a potential thief, including strength and cutting considerations. In addition, the devices use a minimum amount of components while at the same time allowing for a table securing mechanism.

The present invention devices have various embodiments adaptable to smooth tables, rough tables, tables with ledges (overhangs) and tables without ledges. There could be tables of any foreseeable depth and width, but most tables would be of reasonable size and thickness. For some applications it is assumed that the tables have smooth, solid surfaces. (By "tables" as used herein is meant any flat surfaced finishing on which computers and/or computer components may be used, including, but not limited to, conventional tables, desks, shelves, credenzas, computer work stations, cabinets and other office furnishings.)

The devices contemplated by the present invention herein are attachable to a table and otherwise meet the objectives set forth above. They can be manufactured in various sizes so that various size computers can be secured and locked. In certain embodiments, the device operates equally effectively by being attached to either the front or the back of a table.

Figure 1:
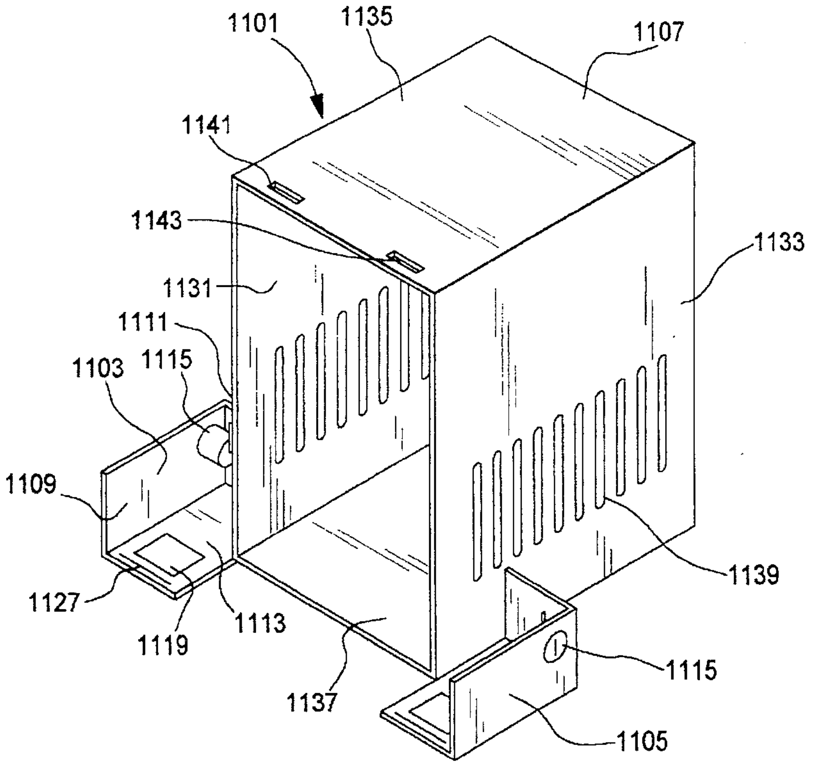
FIG. 1 shows a perspective view of a present invention main housing.
Figure 2:
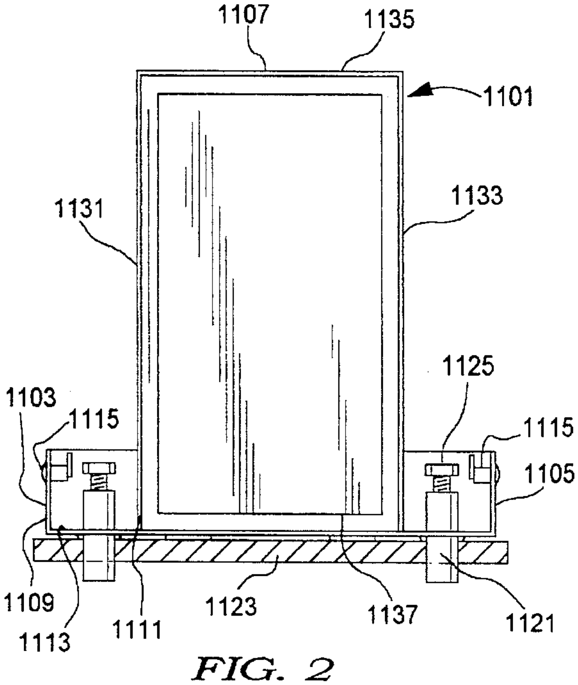
FIG. 2 shows a front view of the main show housing shown in FIG. 1 having clamps for table securing means and being attached to a table.
Figure 3:
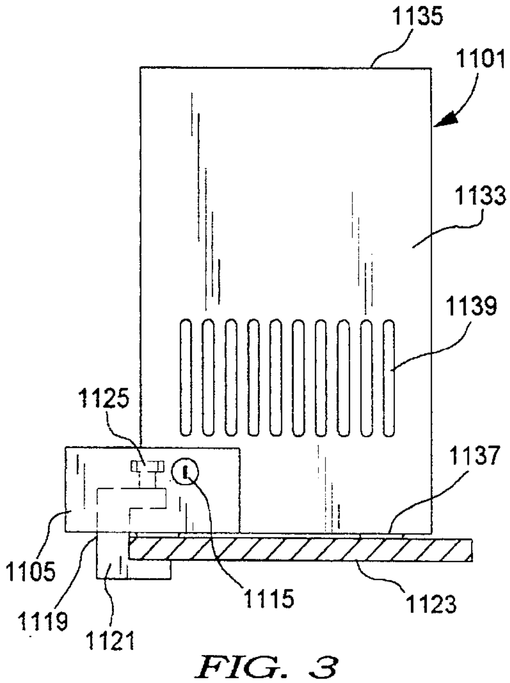
FIG. 3 shows a side view of the main housing shown in FIG. 2.

FIGS. 1, 2 and 3 show a present invention main housing 1101 with computer component loading from a front of main housing 1101. The main housing 1101 is designed for use with a minitower or full tower computer component. Note that both the front and back of a storage portion are both open, thus permitting equal access to the computer when each table securing portion 1103, 1105 are located on either the front of the main housing 1101 or the back of the main housing 1101.

The main housing 1101 includes the table securing portions 1103, 1105 and a storage portion 1107 for storing a computer component. As shown, storage portion 1107 does not contain a computer component, but is designed to slide the computer component into the storage portion 1107.

Each table securing portion 1103 includes an outer sidewall 1109, a back 1111, a bottom 1113, an open top and an open front, as shown. Outer sidewall 1109 includes a lock 1115 for locking a face plate 1117 (see FIG. 4) onto main housing 1101.

Bottom 1113 includes an aperture 1119 which permits a table securing means, i.e., a clamp 1121, to be partially dropped through and affixed to a table 1123 and tightened by twisting a screw 1125. Bottom 1113 also includes an attachment means, i.e., a tab hole 1127 for mating with a similarly matched and correspondingly placed tab protrusion 1129 (see FIG. 4) on face plate 1117.

Storage portion 1107 includes sidewalls 1131, 1133, a top 1135 and a bottom 1137. Each sidewall 1133 includes a plurality of vents 1139 for venting the computer component. Top 1135 includes attachment means, i.e., a plurality of tab holes 1141, 1143 for mating a similarly matched and correspondingly placed plurality of tab protrusions 1145, 1149 on face plate 1117 (see FIG. 4).

Figure 4:
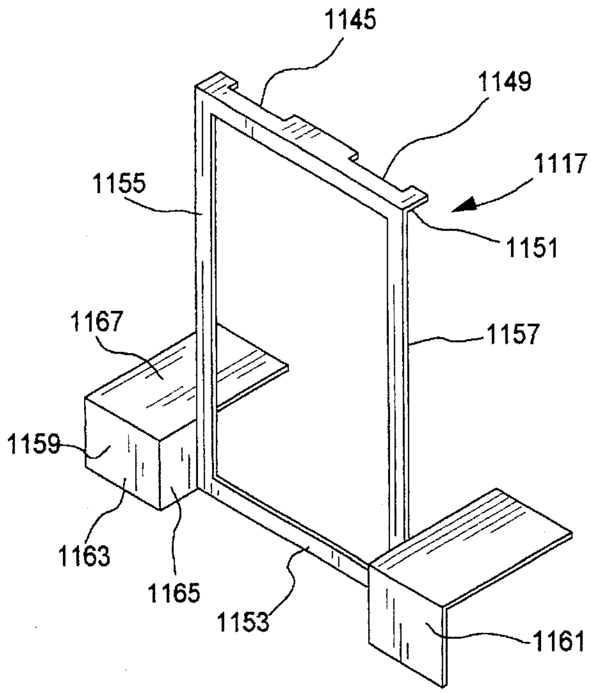
FIG. 4 shows a perspective view of a present invention face plate which covers the main housing shown in FIG. 1.
Figure 5:
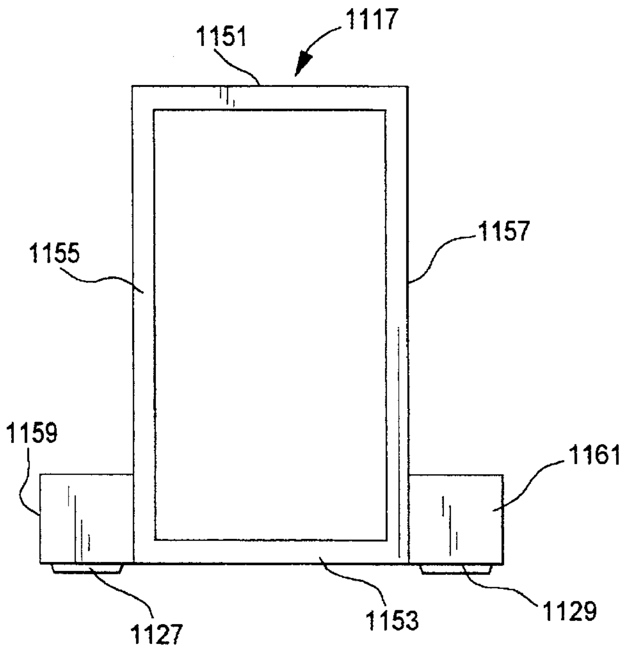
FIG. 5 shows a front view of the face plate shown in FIG. 4.
Figure 6:
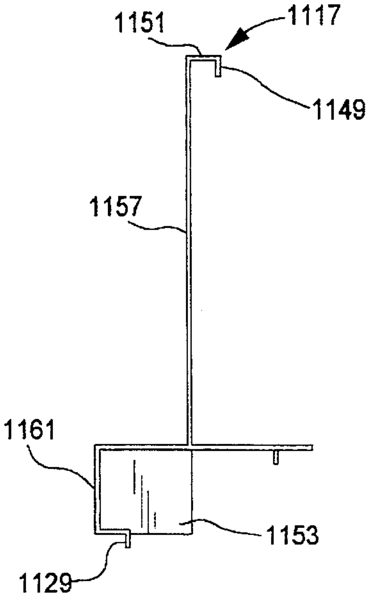
FIG. 6 shows a side view of the face plate shown in FIG. 4.

Referring now to FIGS. 4, 5 and 6, there is shown face plate 1117 which is inserted into tab holes 1127, 1141 and 1143 on main housing 1101 from tab protrusions 1129, 1145, 1149 on face plate 1117. Face plate 1117 includes a top 1151, a bottom 1153, sidewalls 1155, 1157, a pair of table storing means covers 1159, 1161, and an open front and back.

Each table securing means cover 1159 includes a front 1163, an inner sidewall 1165 and a top 1167 and when face plate 1117 is inserted (i.e., closed) and locked into main housing 1101, each table securing means cover 1159 prevents removal of the computer security device which has been placed in the storage portion 1107.

Figure 7:
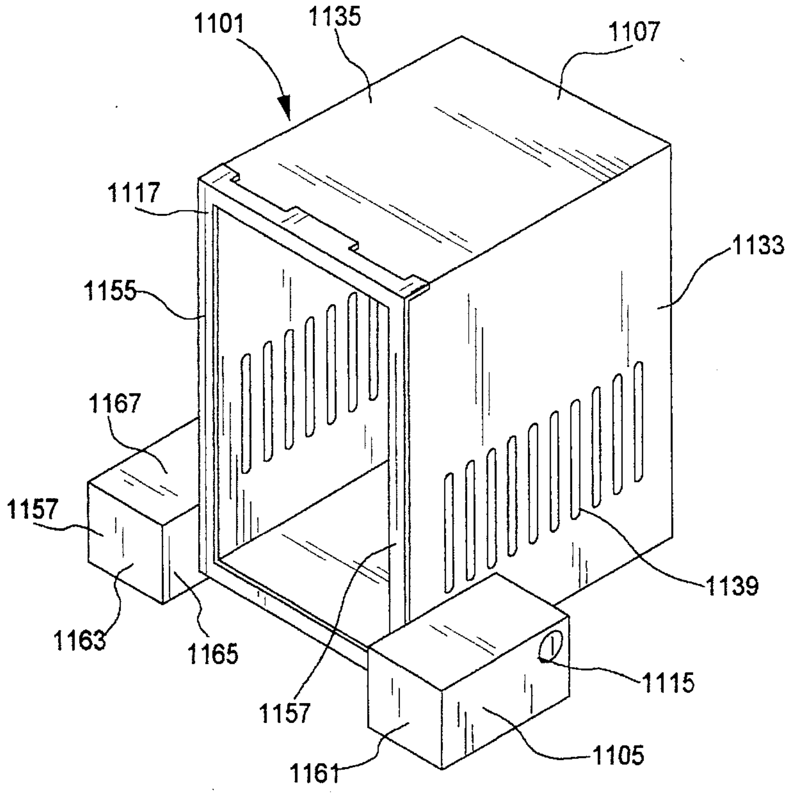
FIG. 7 shows a perspective view of a present invention device with the face plate shown in FIG. 4 connected to the main housing shown in FIG. 1.
Figure 8:
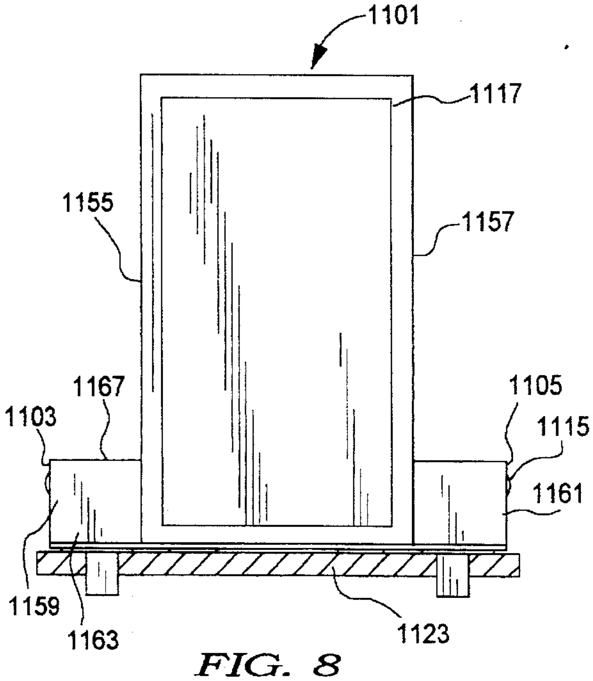
FIG. 8 shows a front view of the present invention device shown in FIG. 7.
Figure 9:
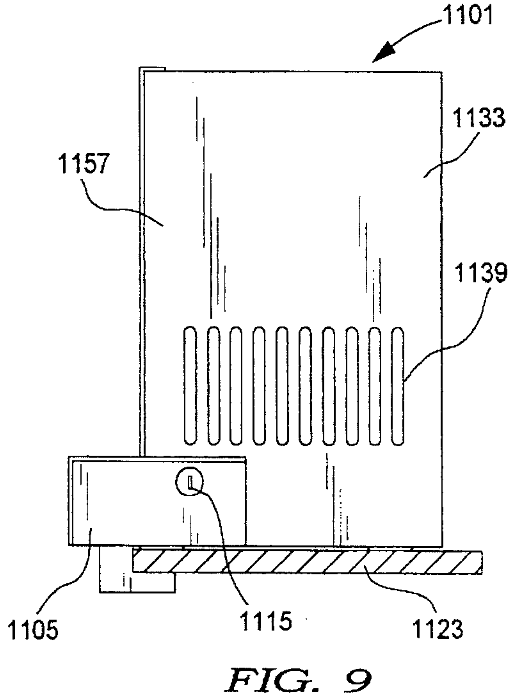
FIG. 9 shows a side view of the present invention device shown in FIG. 7.

Referring now to FIGS. 7, 8 and 9, there is shown a present invention device having the main housing 1101 of FIG. 1 and the face plate of FIG. 4. Face plate 1117 fits into main housing 1101 and prevents removal of a computer component (not shown) from storage portion 1107 after each table securing portion 1103, 1105 has been locked.

Figure 10:
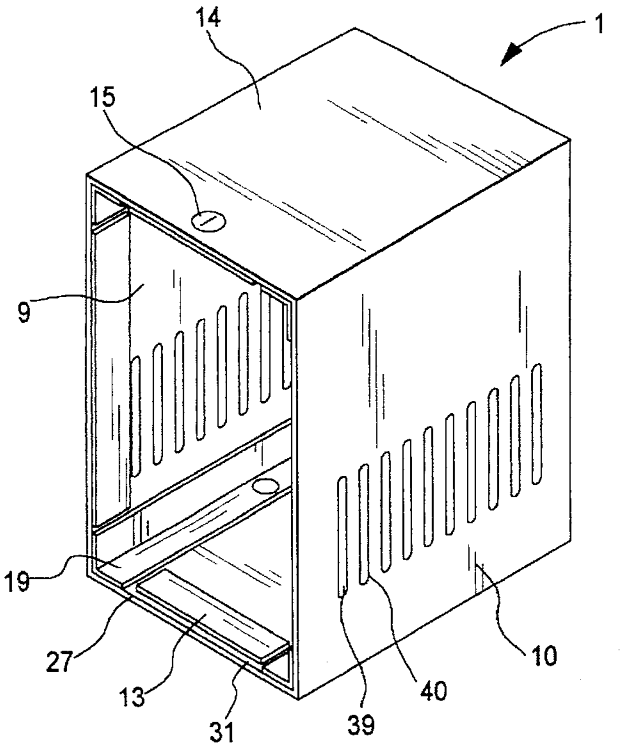
FIG. 10 shows a perspective view of another embodiment of a present invention main housing.
Figure 11:
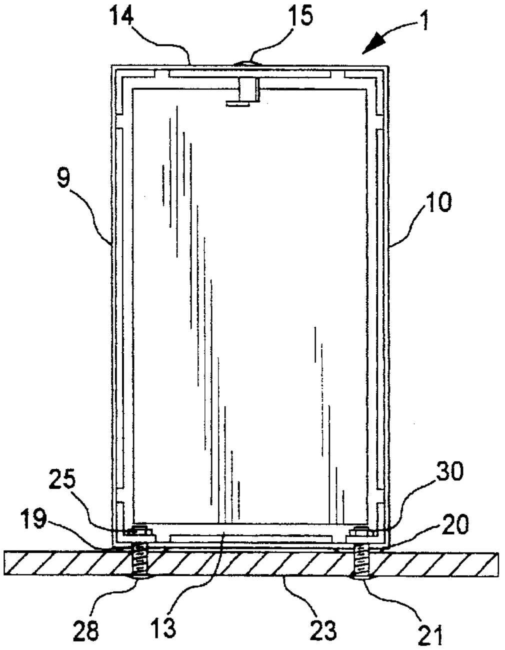
FIG. 11 shows a front view of the main housing with a partial cross-sectional view through a table shown in FIG. 10 having bolts for table securing means and being attached to the table.
Figure 12:
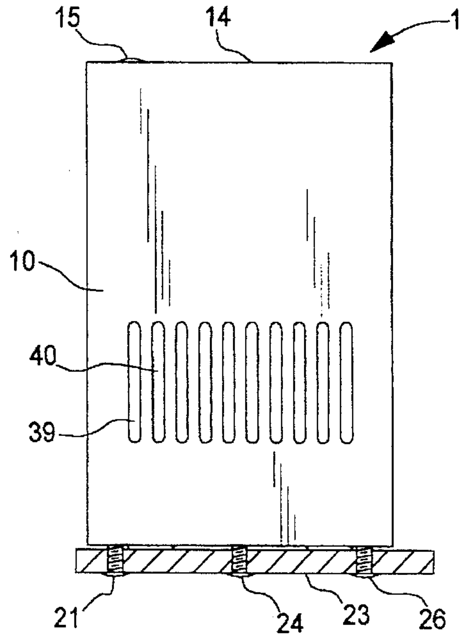
FIG. 12 shows a side view of the main housing shown in FIG. 11.

FIGS. 10, 11 and 12 show another present invention main housing 1 with computer component loading from a front of main housing 1. The main housing 1 is designed for use with a minitower or full tower computer component. In this embodiment, the table securing means are a plurality of bolts 21, 24, 26, 28 and the table securing means is located within the same section of the main housing 1 as the computer component.

As shown, main housing 1 does not contain a computer component, but is designed to slide the computer component into the main housing 1. The main housing includes sidewalls 9, 10, a bottom rim 13, a top 14 and an open front and back, as shown. Top 14 includes a lock 15 for locking a face plate 17 (see FIG. 13) onto main housing 1. Each sidewall 9, 10 includes a plurality of vents 39, 40 for venting the computer component.

Bottom rim 13 includes a plurality of apertures 19, 20 which permit the plurality of table securing means, i.e., bolts 21, 28 to be partially dropped through and affixed to a table 23 and tightened by twisting a plurality of nuts 25, 30. Bottom rim 13 also includes an attachment means, i.e., tab holes 27, 31 for mating with similarly matched and correspondingly placed tab protrusions 29, 33 (see FIG. 13) on face plate 17.

Figure 13:
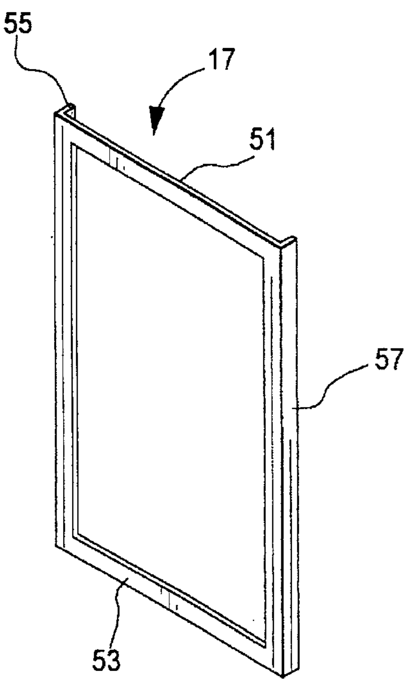
FIG. 13 shows a perspective view of a present invention face plate which covers the main housing shown in FIG. 10.
Figure 14:
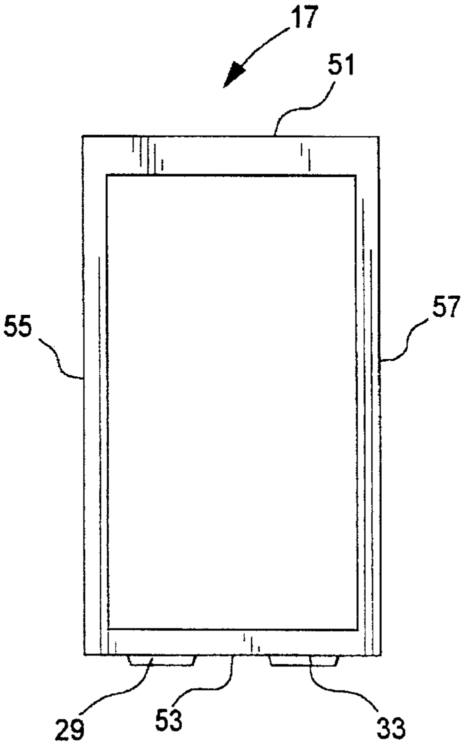
FIG. 14 shows a front view of the face plate shown in FIG. 13.
Figure 15:
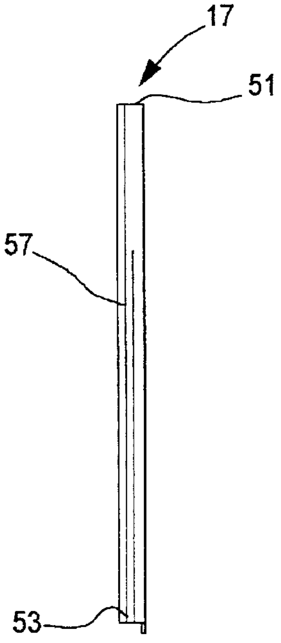
FIG. 15 shows a side view of the face plate shown in FIG. 13.

Referring now to FIGS. 13, 14 and 15, there is shown face plate 17 which is inserted into tab holes 27, 31 on main housing 1 from tab protrusions 29, 33 on face plate 17. Face plate 17 includes a top 51, a bottom 53, sidewalls 55, 57, and an open front and back.

When face plate 17 is inserted (i.e., closed) and locked into main housing 1 through a lock anchor (not shown) on the middle of the top 51 of the face plate 17, face plate 17 prevents removal of the computer security device which has been placed in the main housing 1.

Figure 16:
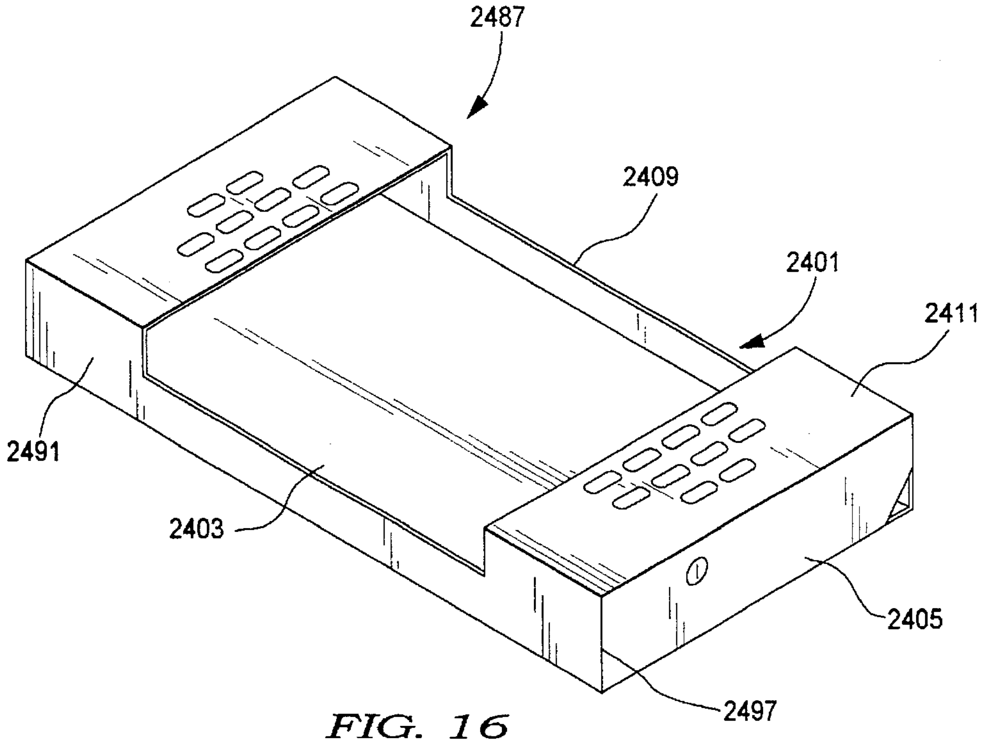
FIG. 16 shows a perspective view of an alternative present invention device having a main housing and a flap.

Referring now to FIG. 16, there is shown a present invention device having a main housing 2401 and a flap 2491 secured to the main housing 2401 at hinge 2497. This embodiment is adapted to house a Thinkpad® or similarly sized and shaped computer component.

Figure 17:
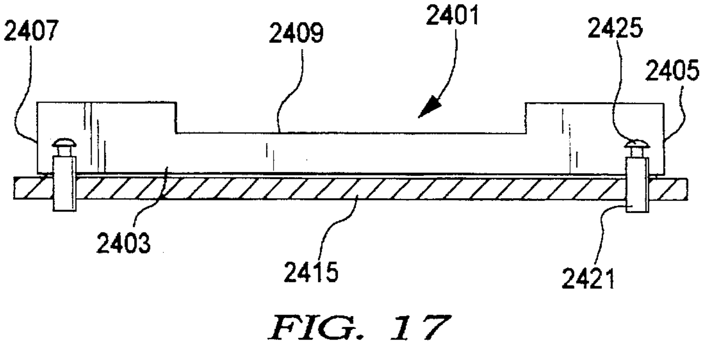
FIG. 17 shows a front view of the main housing of the device shown in FIG. 16 having clamps for table securing means and being attached to a table.
Figure 18:
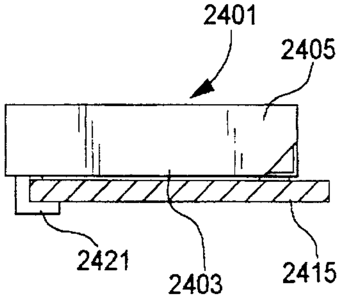
FIG. 18 shows a side view of the main housing shown in FIG. 16.

FIGS. 17 and 18 show a front view and a side view, respectively, of the main housing 2401 shown in FIG. 16. The main housing 2401 includes a bottom 2403, sidewalls 2405, 2407, a recessed back 2409, a partially open top 2411 and an open front. A table securing means, i.e., a clamp 2421, extends through the open front and is affixed to a table 2415 and tightened by twisting a screw 2425, nut or the like.

Figure 19:
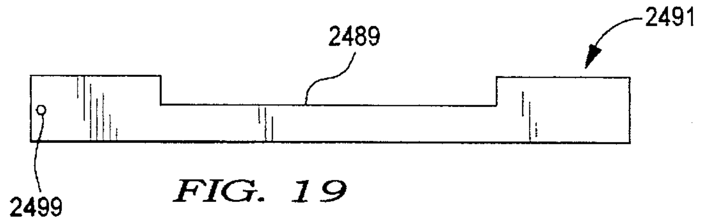
FIG. 19 shows a front view of the flap used to cover the main housing shown in FIG. 17.

FIG. 19 shows a front view of the flap 2491 which is attached at hinge 2497(see FIG. 16) to the main housing 2401. The flap 2491 includes a lock 2499 which when the flap 2491 is closed and locked prevents access to the table securing means 2421, and a recessed front 2489. The recessed front 2489 exposes the front of the computer for access and use by the user.

Figure 20:
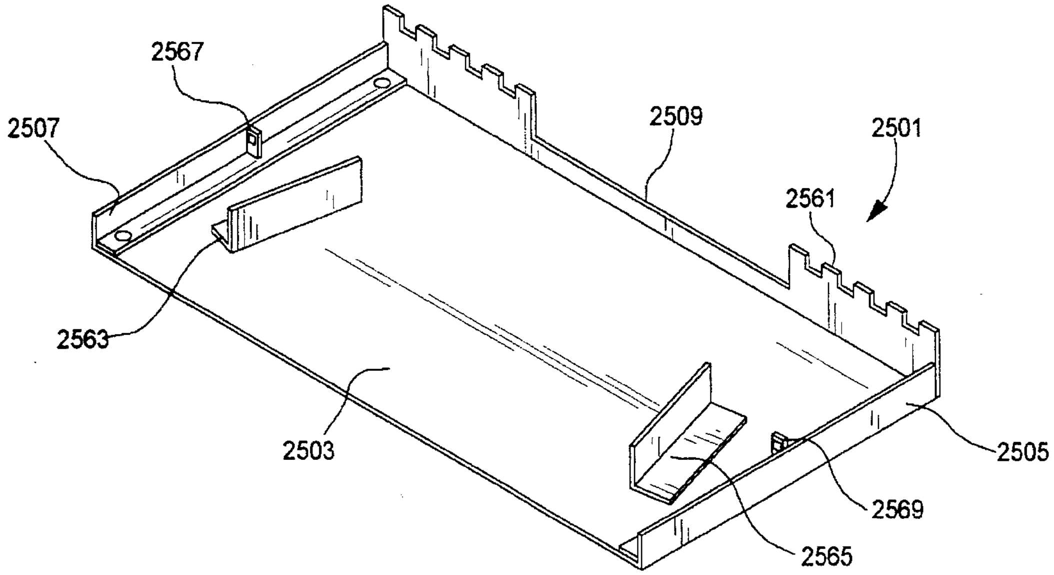
FIG. 20 shows a perspective view of an alternative present invention main housing.
Figure 21:
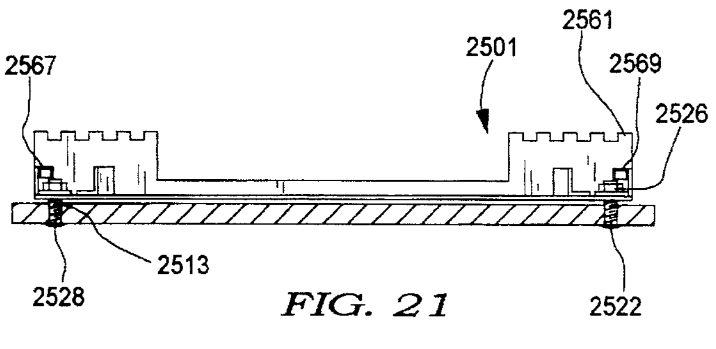
FIG. 21 shows a front view of the main housing shown in FIG. 20 with a partial cross-sectional view through a table and having bolts for the table securing means and being attached to the table.
Figure 22:
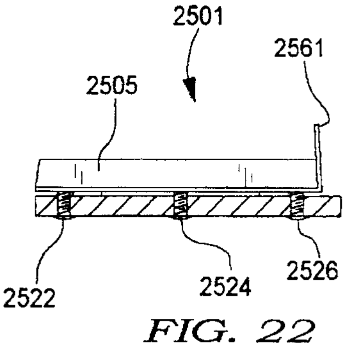
FIG. 22 shows a side view of the main housing shown in FIG. 21.

FIGS. 20, 21 and 22 show still yet another alternative embodiment of a present invention main housing 2501 which is also adapted to house a Thinkpad® or similarly sized and shaped computer component. This embodiment is similar to the embodiment described in FIGS. 16, 17 and 18 and like parts are similarly numbered but beginning with "25".

In this embodiment, the top 2511 of the main housing 2501 contains a hinge 2561 which attaches a top plate 2591 to the main housing 2501. Also included are a pair of guides 2563, 2565 which center the docking station which houses the Thinkpad®. The table securing means are a plurality of carriage bolts 2522, 2524, 2526, 2528 which are tightened by twisting a plurality of nuts 2526 and which estend through at least one aperture 2513 on the bottom 2503. Located on sidewalls 2505, 2507 are lock anchors 2569, 2567, respectively, which secure the top plate 2591 onto the main housing 2501.

Figure 23:
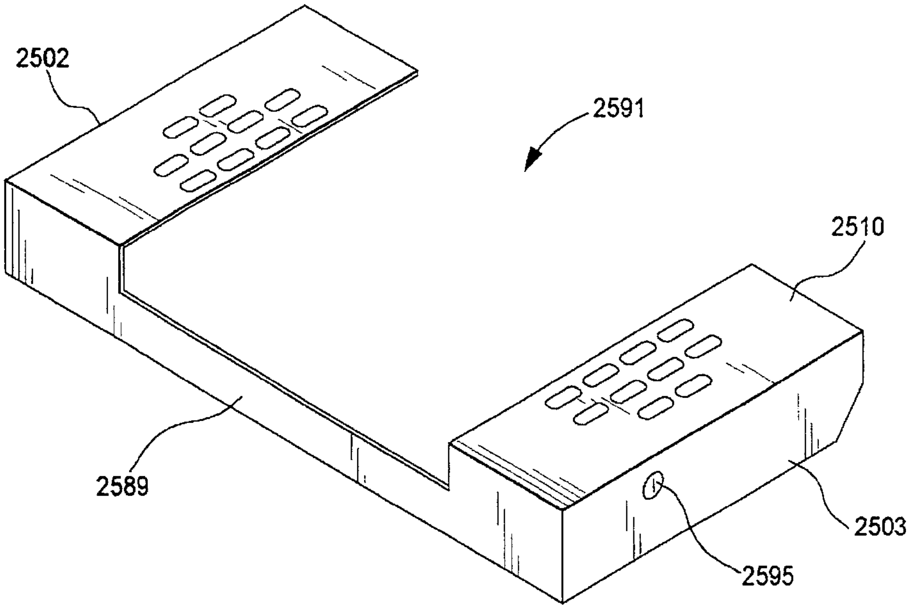
FIG. 23 shows a perspective view of a top plate used to cover the main housing shown in FIG. 20.
Figure 24:
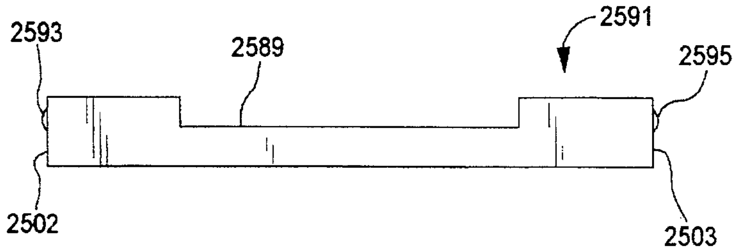
FIG. 24 shows a front view of the top plate shown in FIG. 23.
Figure 25:
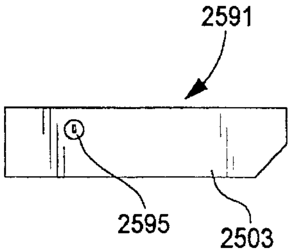
FIG. 25 shows a side view of the top plate shown in FIG. 23.

FIGS. 23, 24 and 25 show a perspective view, a front view and a side view of the top plate 2591 which is connected and locked to main housing 2501. The top plate 2591 includes locks 2593 and 2595 which when the top plate 2591 is connected to the main housing 2501 and locked, prevents access to the table securing means 2522, 2524, 2526, 2528. The top plate 2591 includes a recessed front 2589, sidewalls 2502, 2503 and a partially open top 2510. The recessed front 2589 exposes the front of the computer for access and use by the user.

Figure 26:
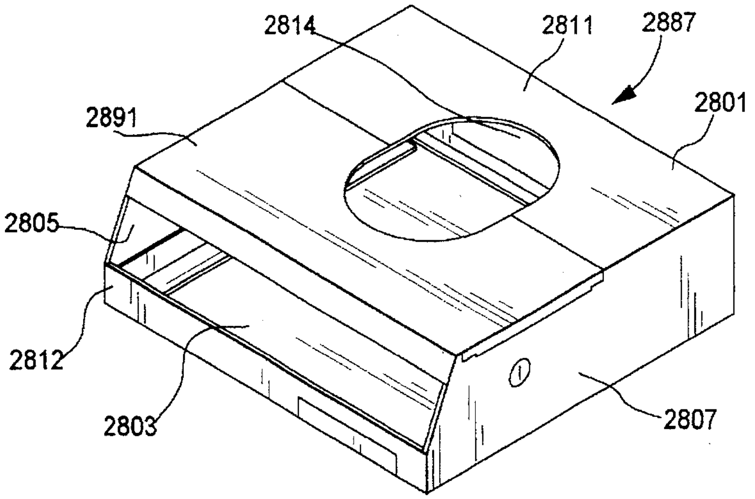
FIG. 26 shows a perspective view of an alternative present invention device having an alternative main housing and an alternative top plate.

FIG. 26 shows still yet another embodiment of a present invention device 2887 having a main housing 2801 and a-top plate 2891. This embodiment is designed to be used with an IBM® PS/1 CPU and monitor or other similarly sized and configured computer component. Here the table securing portions and the storage portion are in the same section of the main housing 2801.

Figure 27:
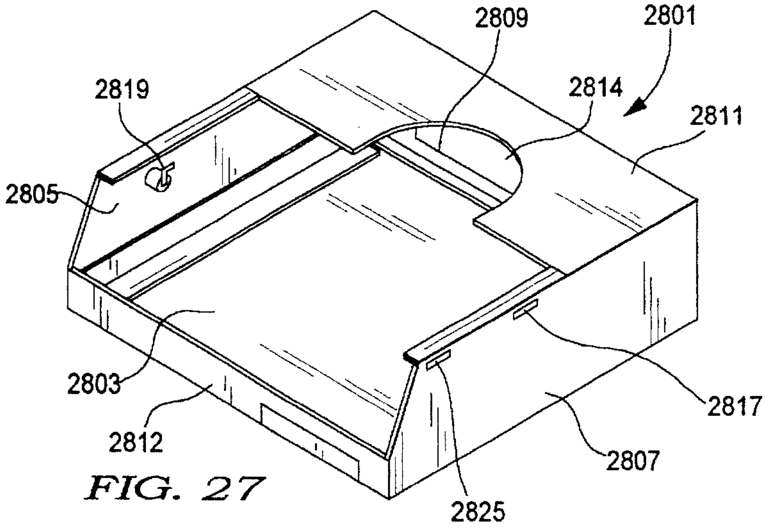
FIG. 27 shows a perspective view of the main housing of the present invention device shown in FIG. 26.
Figure 28:
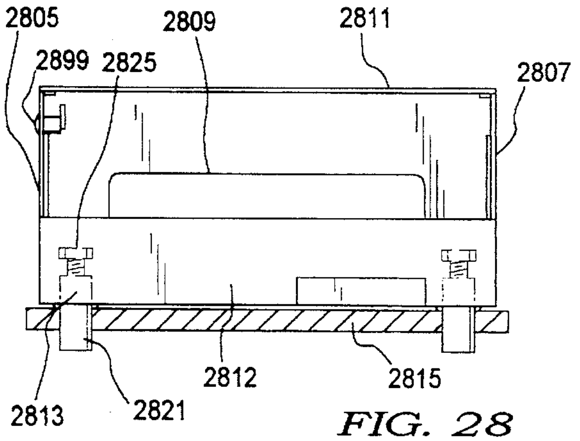
FIG. 28 shows a front view of the main housing shown in FIG. 27 having clamps as the table securing means attached to a table.
Figure 29:
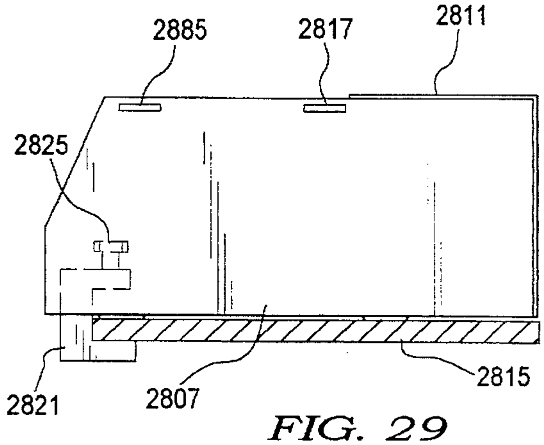
FIG. 29 shows a side view of the main housing shown in FIG. 28.

Referring now to FIGS. 27, 28 and 29, there is shown a perspective view, a front view and a side view of the main housing shown in FIG. 26. The main housing 2801 includes a partially open bottom 2803, sidewalls 2805, 2807, a recessed back 2809, a partially open top 2811 and a front 2812 which has a lower height than the height of the sidewalls 2805, 2807. The bottom 2803 includes at least one aperture 2813 which permits a table securing means, i.e., a clamp 2821, to be partially dropped through and affixed to a table 2815 and tightened by twisting a screw 2825, nut or the like.

The top 2811 partially covers the main housing 2801 and has an approximate semi-circular cut-out portion 2814 on an inner edge. The approximate semi-circular cut-out portion 2814 is sized and shaped to tightly engage the neck of a computer monitor on one side.

The sidewall 2807 includes at least one tab hole 2817, 2825 for connection to the top plate 2891. The other sidewall 2805 includes at least one tab hole (not shown) and a lock 2899 which when locked and having the top plate 2891 inserted into the main housing 2801 and therefore the top plate 2891 being in a closed position, prevents access to the table securing means 2821.

Figure 30:
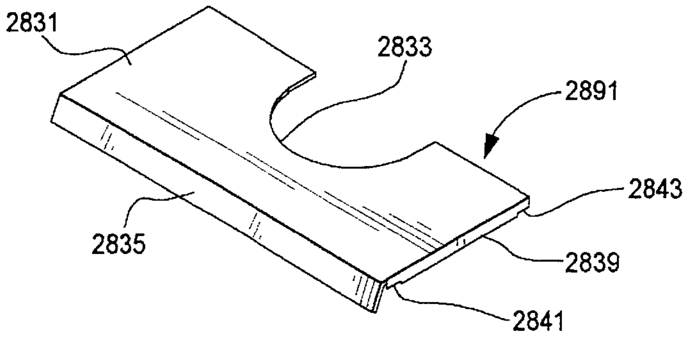
FIG. 30 shows a perspective view of the top plate shown in FIG. 26.
Figure 31:
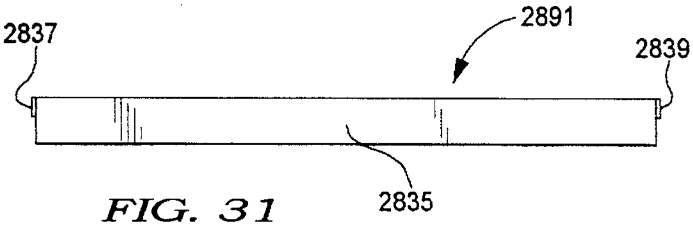
FIG. 31 shows a front view of the top plate shown in FIG. 30.
Figure 32:
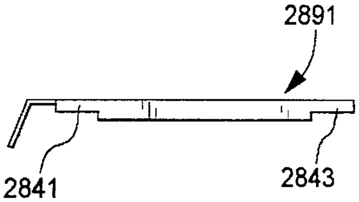
FIG. 32 shows a side view of the top plate shown in FIG. 30.

FIGS. 30, 31 and 32 show the top plate 2891 which is connected to the main housing 2801 and prevents access to the table securing means 2821 when the top plate 2891 is connected to the main housing 2801 and the main housing 2801 is locked.

The top plate 2891 includes a top 2831 having an approximate semicircular cut-out portion 2833, a front ledge 2835, and sidewalls 2837, 2839. Each sidewall 2837, 2839 has at least one tab protrusion 2841, 2843, (shown on sidewall 2839) for mating with a correspondingly placed tab hole on the main housing 2801.

The approximate semi-circular cut-out portion 2833 matches with the semi-circular portion 2814 of the main housing 2801 and the two portions 2814, 2833 together tightly engage the neck of a computer monitor.

Figure 33:
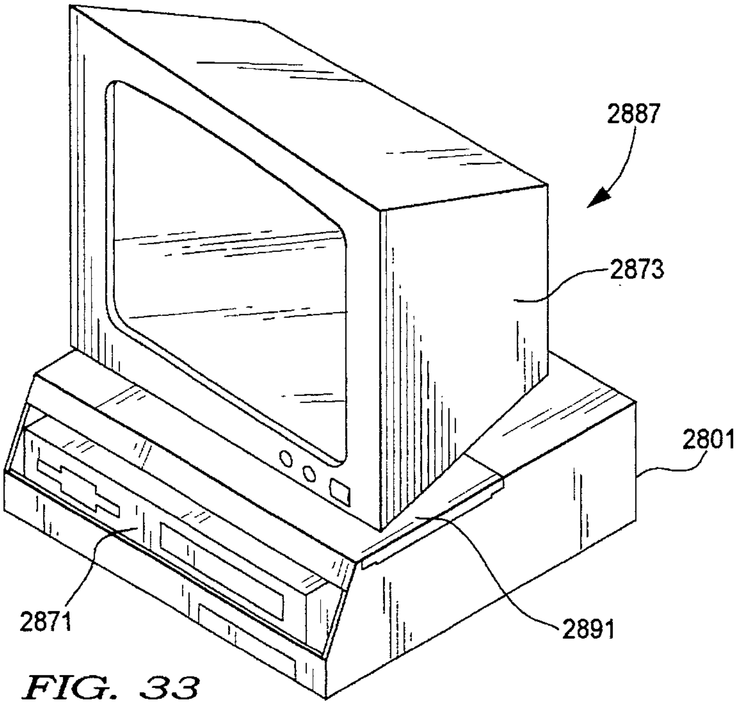
FIG. 33 shows the present invention device shown in FIG. 26 having computer components installed.

FIG. 33 shows a present invention device 2887 with a CPU 2871 and a computer monitor 2873 locked into place. The CPU 2871 is slid into the main housing 2801 and the monitor 2873 is placed on top of the CPU 2871 and slid into the approximate semi-circular portion 2814. The top plate 2891 is then fitted into place by joining corresponding tabs and the main housing 2801 is locked preventing access to the table securing means 2821 and securing the computer comments.

Figure 34:
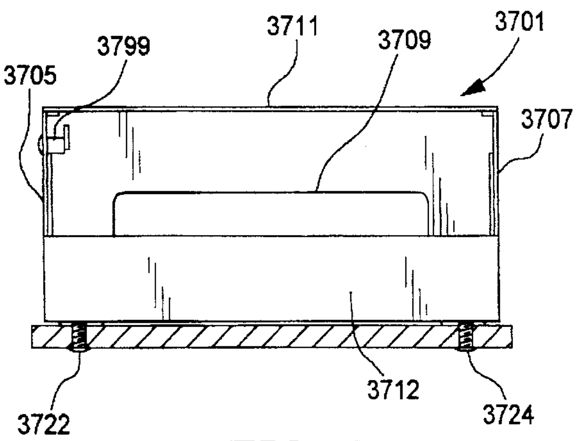
FIG. 34 shows a front view of an alternative embodiment of a present invention main housing with a partial cross-sectional view through a table having bolts for the table securing means and being attached to the table.
Figure 35:
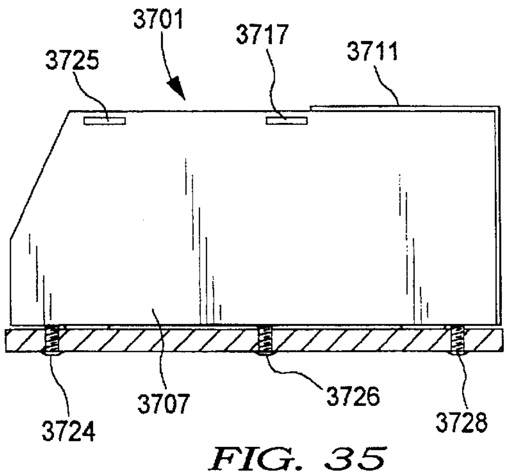
FIG. 35 shows a side view of the present invention main housing shown in FIG. 34.

FIGS. 34 and 35 show a front view and a side view, respectively, of a main housing 3701, which is similar to that shown in FIG. 27 but having a plurality of carriage bolts 3722, 3724, 3726 and 3728 as the table securing means. Like parts are similarly numbered to the parts in FIGS. 28 and 29 but beginning with "37". A top plate similar to that described in FIGS. 33, 34 and 35 secures the CPU and monitor in place.

Obviously, numerous modifications and variations of the present invention are possible in light of the above teachings. For example, table securing means other than bolts or clamps such as suction cups in conjunction with clamps, extendable clamps, tie down straps and the like could be used. Computer components do not necessarily have to be secured. Any valuable device, such as a VCR, a television, or the like may be secured with these devices. It is therefore understood that within the scope of the appended claims, the invention may be practiced otherwise than as specifically described herein.

What is claimed is:

1. A computer component securing device, which comprises:

(a) a main housing having a storage portion and a pair of table securing portions, said storage portion adapted to store a computer component and-being attached to each table securing portion, said each table securing portion having a bottom, at least one sidewall, and a back, and having at least one opening in at least one of said bottom, back and sidewall for passing a table securing device at least partially therethrough;

(b) a positioning means for positioning a computer component so as to have a first, open position wherein the computer component may be inserted and removed from said storage portion and so as to have a second, closed position such that an inserted computer component cannot be removed therefrom, but so as to expose functional aspects of the computer component for utilization by a user when said positioning means is in its second, closed position, said positioning means being attachable to said main housing, (c) locking means connected to said positioning means and said main housing and being adapted so as to permit locking and unlocking of one of said positioning means and said main housing when said positioning means is in its second, closed position; and, (d) table securing means extending through said at least at one opening in said securing portion and connected to said securing portion inside said securing portion, and having an attachment mechanism outside of said securing portion which is securably connectable to a table, wherein said table securing means is attachable to a table from operating it from inside of said securing portion and, when said positioning means is in its second, closed position and is locked, said table securing means, when attached to a table, is unattachable from said table without force.

2. The device of claim 1 wherein said table securing means includes at least one clamp for attachment to a ledge of table.

3. The device of claim 22 wherein said table securing means includes at least one c-clamp.

4. The device of claim 2 wherein said storage portion includes a bottom, sidewalls, a top and an open front and back.

5. The device of claim 4 wherein said positioning means includes a face plate removably connected to said main housing and being adapted so as to cover exposed surfaces on said at least one securing portion of said main housing.

6. The-device of claim 5 wherein said face plate is connected to said main housing at said top of said storage portion through at least one upper tab and is connected to said main housing at said securing portion through at least one lower tab.

7. The device of claim 6 wherein said face plate includes a top, a bottom, sidewalls, a pair of table securing portion covers and an open front and back.

8. The device of claim 7 wherein each table securing portion cover includes a top, an inner sidewall and a front.

9. The device of claim 8 wherein said main housing is adapted to be attached to a ledge of a table.

10. The device of claim 1 wherein said table securing means includes at least one bolt.

* * * * *